United States Patent
Kwon et al.

(10) Patent No.: US 8,095,100 B2
(45) Date of Patent: Jan. 10, 2012

(54) RECEIVER WITH SIGMA-DELTA STRUCTURE

(75) Inventors: Yong Il Kwon, Gyunggi-Do (KR); Sang Hyun Min, Gyunggi-Do (KR); Tah Joon Park, Gyunggi-Do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 804 days.

(21) Appl. No.: 12/137,479

(22) Filed: Jun. 11, 2008

(65) Prior Publication Data

US 2009/0131004 A1 May 21, 2009

(30) Foreign Application Priority Data

Nov. 20, 2007 (KR) .................. 10-2007-0118710

(51) Int. Cl.
*H04B 17/00* (2006.01)
*H04B 1/06* (2006.01)
*H04B 7/00* (2006.01)

(52) U.S. Cl. ............. 455/226.1; 455/226.2; 455/232.1

(58) Field of Classification Search .......... 455/67.11, 455/67.13, 226.1–226.4, 232.1–252.1
See application file for complete search history.

(56) References Cited

U.S. PATENT DOCUMENTS

| | | | |
|---|---|---|---|
| 6,311,047 B1 * | 10/2001 | Gotou | 455/234.1 |
| 6,560,448 B1 * | 5/2003 | Baldwin et al. | 455/234.1 |
| 6,993,291 B2 * | 1/2006 | Parssinen et al. | 455/67.11 |
| 7,212,798 B1 * | 5/2007 | Adams et al. | 455/251.1 |
| 7,215,269 B2 | 5/2007 | Lee et al. | |
| 7,242,915 B2 * | 7/2007 | Shi | 455/232.1 |
| 7,486,942 B2 * | 2/2009 | Sakurai | 455/314 |
| 7,561,863 B2 * | 7/2009 | Ikeda et al. | 455/232.1 |
| 7,565,124 B2 * | 7/2009 | Lee et al. | 455/234.1 |
| 7,580,690 B2 * | 8/2009 | Fujishima et al. | 455/251.1 |
| 7,593,484 B2 * | 9/2009 | Beamish et al. | 375/318 |
| 7,664,211 B2 * | 2/2010 | Solum | 375/345 |
| 7,684,516 B2 * | 3/2010 | Salvi et al. | 375/316 |
| 7,890,075 B2 * | 2/2011 | Xin et al. | 455/247.1 |
| 2003/0027538 A1 * | 2/2003 | Masumoto et al. | 455/234.1 |
| 2007/0241821 A1 * | 10/2007 | Dally et al. | 330/279 |

* cited by examiner

*Primary Examiner* — Simon Nguyen

(74) *Attorney, Agent, or Firm* — Lowe, Hauptman, Ham & Berner, LLP

(57) ABSTRACT

There is provided a receiver with a sigma-delta structure, the receiver including: a low noise amplifier amplifying a received signal according to a detection signal; a mixer converting an RF signal of the low noise amplifier into an IF signal; a sigma-delta A/D converter converting the IF signal from the mixer 200 into a digital signal; a 1 bit detector determining whether a voltage of the output signal of the mixer is greater than that of a predetermined reference voltage and outputting the detection signal including a result of the determination; and a demodulator obtaining an FFT result with respect to the signal from the sigma-delta A/D converter and adding or subtracting a predetermined gain value to or from the FFT result to calculate received signal strength indication (RSSI).

7 Claims, 7 Drawing Sheets

US 8,095,100 B2

RECEIVER WITH SIGMA-DELTA STRUCTURE

CROSS-REFERENCE TO RELATED APPLICATIONS

This application claims the priority of Korean Patent Application No. 2007-0118710 filed on Nov. 20, 2007, in the Korean Intellectual Property Office, the disclosure of which is incorporated herein by reference.

BACKGROUND OF THE INVENTION

1. Field of the Invention

The present invention relates to a receiver with a sigma-delta structure that can applied to a WPAN communication system, such as Zigbee, and more particularly, to a receiver with a sigma-delta structure that can perform signal amplification and RSSI calculation according to power of an output signal of a mixer without using an automatic gain controller (AGC) in a configuration using a sigma-delta A/D converter.

2. Description of the Related Art

In general, a receiver that can be applied to a wireless personal area network (WPAN) communication system, such as Zigbee, includes a low noise amplifier (LNA), a mixer, a programmable gain amplifier (PGA), a automatic gain controller (AGC), a band pass filter (BPF), and the like. However, the general receiver has lower adaptability to a communication environment, for example, low current consumption.

An RF receiver has been gradually digitalized. The digitalized receiver may use a sigma-delta A/D converter as an A/D converter.

However, when the sigma-delta A/D converter is used by a method according to the related art, a receiver uses a received signal strength indicator (RSSI) that indicates sensitivity of a received signal and an existing AGC. For this reason, the receiver is limited in terms of current consumption and area when digitalizing the receiver.

FIG. 1 is a configuration view illustrating a receiver according to the related art that uses a general A/D converter.

As shown in FIG. 1, a receiver according to the related art includes a low noise amplifier 11, a mixer 12, a filter 13, a PGA 14, an A/D converter 15, and a demodulator 16. The low noise amplifier 11 amplifies a signal from an antenna ANT. The mixer 12 converts an RF signal from the low noise amplifier 11 into an IF signal. The filter 13 passes the IF signal from the mixer 12. The PGA 14 controls power of the IF signal from the filter 13. The A/D converter 15 converts an analog signal from the PGA 14 into a digital signal. The demodulator 16 automatically controls the gain of the PGA 14 and demodulates the signal from the A/D converter 15.

The demodulator 16 of the receiver according to the related art can calculate power of a received signal by the following Equation 1.

$$파워(Power) = (SI - \text{offset})^2 + (SQ - \text{offset})^2 \quad \text{[Equation 1]}$$

Here, offset is an intermediate value of the output signal of the A/D converter 15.

The demodulator 16 calculates the power of the received signal by the above Equation 1 and controls the gain of the PGA 14 according to the power, so that a signal having an appropriate level is supplied to the A/D converter 15.

In the receiver according to the related art, shown in FIG. 1, a constant value always needs to be input to the A/D converter 15. To this end, a PGA is used.

However, since the A/D converter has a narrow input range, the A/D converter is limited when processing a received signal. To overcome this, a sigma-delta A/D converter that has advantages in terms of area and current consumption may be directly applied to the receiver according to the related art, shown in FIG. 1, to use the PGA, which undermines the advantages of the sigma-delta A/D converter. Accordingly, there is a need for a receiver adaptive to the sigma-delta A/D converter.

FIG. 2 is a configuration view illustrating a receiver with a sigma-delta A/D converter according to the related art.

A receiver with a sigma-delta A/D converter according to the related art, shown in FIG. 2, includes an RF unit 21, a filter 22, an AGC 23, a sigma-delta A/D converter 24, and a demodulator 25. The RF unit 21 converts an RF signal from an antenna ANT into an IF signal. The filter 22 passes the IF signal from the RF unit 21. The AGC 23 amplifies the signal form the filter 22 according to automatic gain control. The sigma-delta A/D converter 24 converts the signal from the AGC 23 into a digital signal according to a sigma-delta conversion method. The modulator 25 detects RSSI (received signal strength indication) with respect to the digital signal from the sigma-delta A/D converter 24 and automatically controls the gain of the AGC 23.

The receiver according to the related art, shown in FIG. 2, can use the sigma-delta A/D converter. However, when a received signal has a low level, a separate AGC structure is required for the sigma-delta converter to normally process a signal. This may cause an increase in manufacturing costs.

However, if the AGC structure is not used, the modulator cannot detect RSSI.

SUMMARY OF THE INVENTION

An aspect of the present invention provides a receiver with a sigma-delta structure that can perform signal amplification and RSSI calculation according to power of an output signal of a mixer without using an automatic gain controller (AGC) in a configuration using a sigma-delta A/D converter.

According to an aspect of the present invention, there is provided a receiver with a sigma-delta structure, the receiver including: a low noise amplifier amplifying a received signal according to a detection signal; a mixer converting an RF signal of the low noise amplifier into an IF signal; a sigma-delta A/D converter converting the IF signal from the mixer 200 into a digital signal; a 1 bit detector determining whether a voltage of the output signal of the mixer is greater than that of a predetermined reference voltage and outputting the detection signal including a result of the determination; and a demodulator obtaining an FFT result with respect to the signal from the sigma-delta A/D converter and adding or subtracting a predetermined gain value to or from the FFT result to calculate received signal strength indication (RSSI).

The bit detector may include a rectifier rectifying the output signal of the mixer and detecting a voltage of the output signal of the mixer; and a comparator comparing a detection voltage from the rectifier with the reference voltage and outputting the detection signal including a result of the comparison.

The low noise amplifier may include a path switch connecting a received signal input terminal to one of an amplification path and a bypass path according to the detection signal; and an amplifier provided along the amplification path selected by the path switch and amplifying a signal passing through the path switch 110 and the amplification path.

The demodulator may include an FFT unit obtaining the FFT result with respect to the signal from the sigma-delta A/D converter; a level determining unit determining a level of the detection signal; and a received signal strength calculation unit calculating received signal strength indication (RSSI) by subtracting a predetermined gain value from the FFT result according to the level determined by the level determining unit.

The received signal strength indication calculation unit may obtain the RSSI by adding a predetermined constant to the FFT result when the level is a weak signal level and obtain the RSSI by adding the predetermined constant to and subtracting the gain value from the FFT result.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
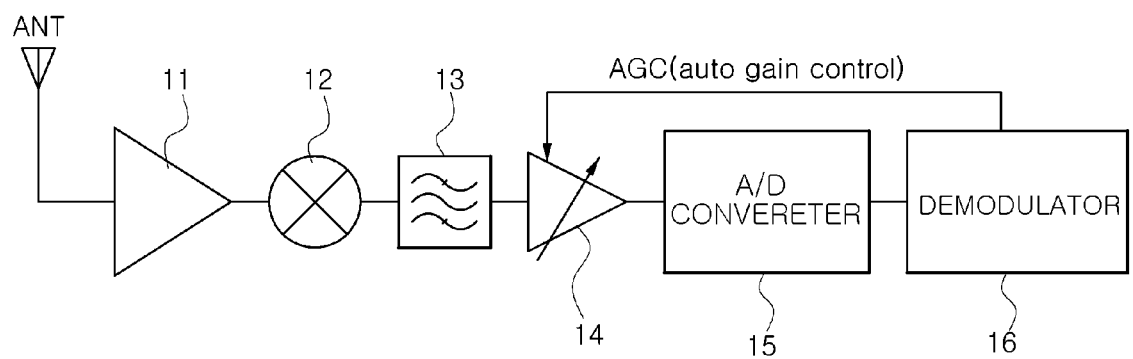
FIG. 1 is a configuration view illustrating a receiver using a general A/D converter according to the related art.
Figure 2:
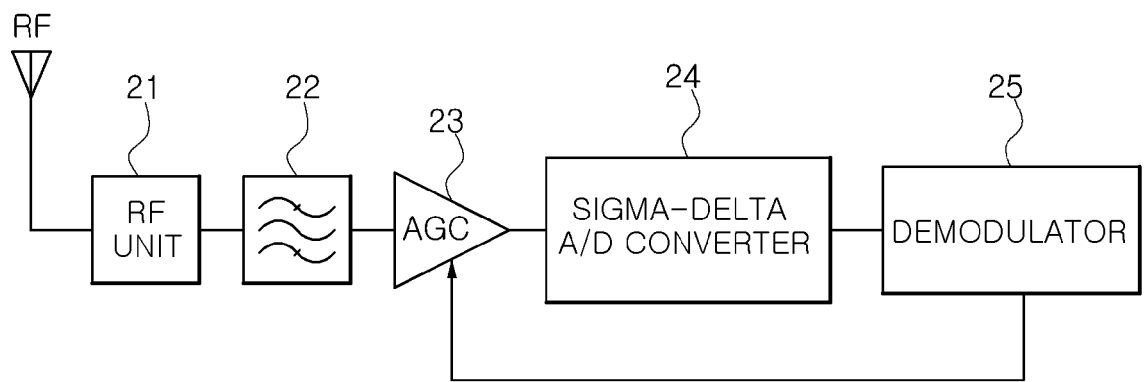
FIG. 2 is a configuration view illustrating a receiver with a sigma-delta A/D converter according to the related art.

Exemplary embodiments of the present invention will now be described in detail with reference to the accompanying drawings.

The invention may however be embodied in many different forms and should not be construed as limited to the embodiments set forth herein. Rather, these embodiments are provided so that this disclosure will be thorough and complete, and will fully convey the scope of the invention to those skilled in the art. Also, in the drawings, the same reference numerals are used throughout to designate the same components.

Figure 3:
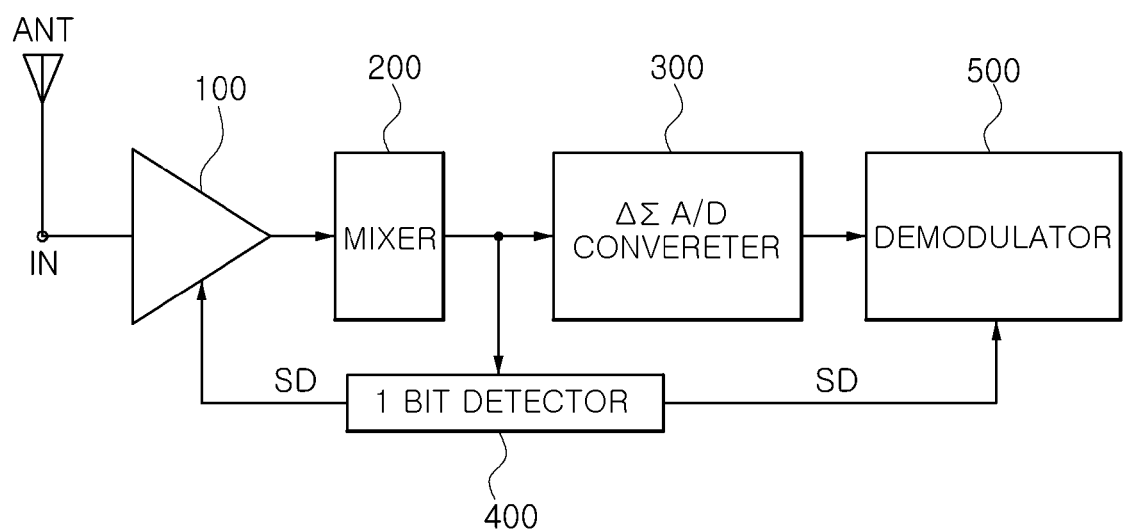
FIG. 3 is a configuration view illustrating a receiver with a sigma-delta structure according to an exemplary embodiment of the present invention.

FIG. 3 is a configuration view illustrating a receiver with a sigma-delta structure according to an exemplary embodiment of the invention.

Referring to FIG. 3, a receiver with a sigma-delta structure according to an embodiment of the invention includes a low noise amplifier 100, a mixer 200, a sigma-delta A/D converter 300, a 1 bit detector 400, and a demodulator 500. The low noise amplifier 100 amplifies a received signal according to a detection signal SD. The mixer 200 converts an RF signal from the low noise amplifier 100 into an IF signal. The sigma-delta A/D converter 300 converts the IF signal from the mixer 200 into a digital signal. The 1 bit detector 400 determines whether a voltage of an output signal from the mixer 200 is greater than a predetermined reference voltage and outputs the detection signal SD that includes a result of the determination. The demodulator 500 obtains an FFT result VFFT with respect to the signal from the sigma-delta A/D converter 300 and calculates received signal strength indication (RSSI) by adding or subtracting a predetermined gain value Vgain to or from the FFT result VFFT according to the detection signal SD.

Figure 4:
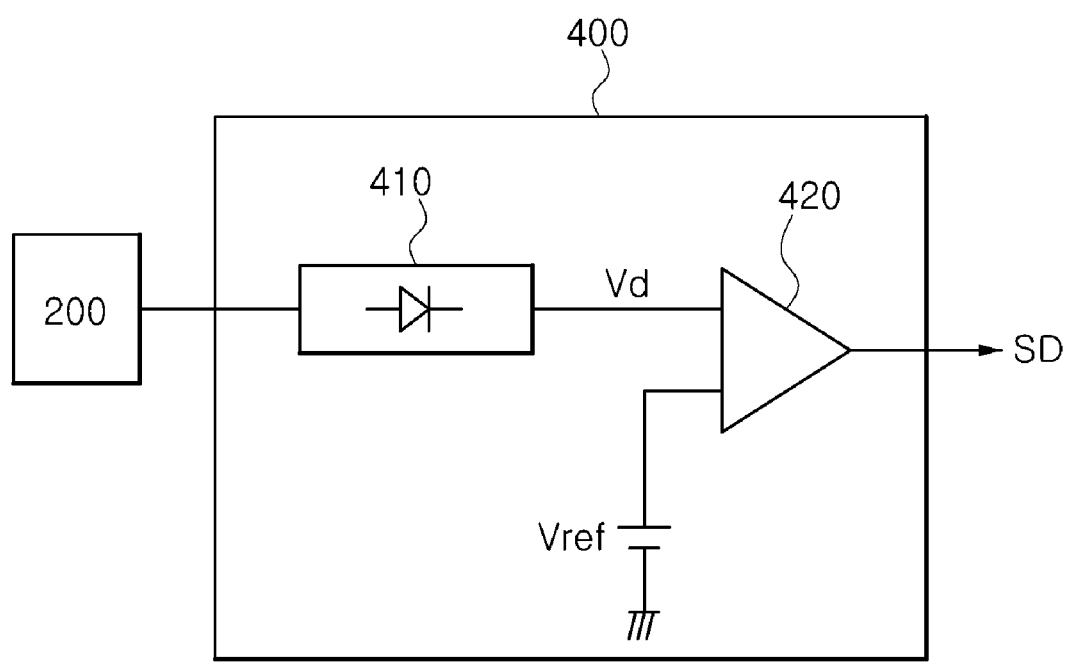
FIG. 4 is a configuration view illustrating a 1 bit detector according to an exemplary embodiment of the present invention.

FIG. 4 is a configuration view illustrating a 1 bit detector according to an exemplary embodiment of the present invention.

Referring to FIG. 4, the 1 bit detector 400 includes a rectifier 410 and a comparator 420. The rectifier 410 rectifies the output signal from the mixer 200 and detects a voltage of the output signal of the mixer 200. The comparator 420 compares a detection voltage Vd from the rectifier 410 with a reference voltage Vref and outputs the detection signal SD that includes a comparison of the determination.

Figure 5:
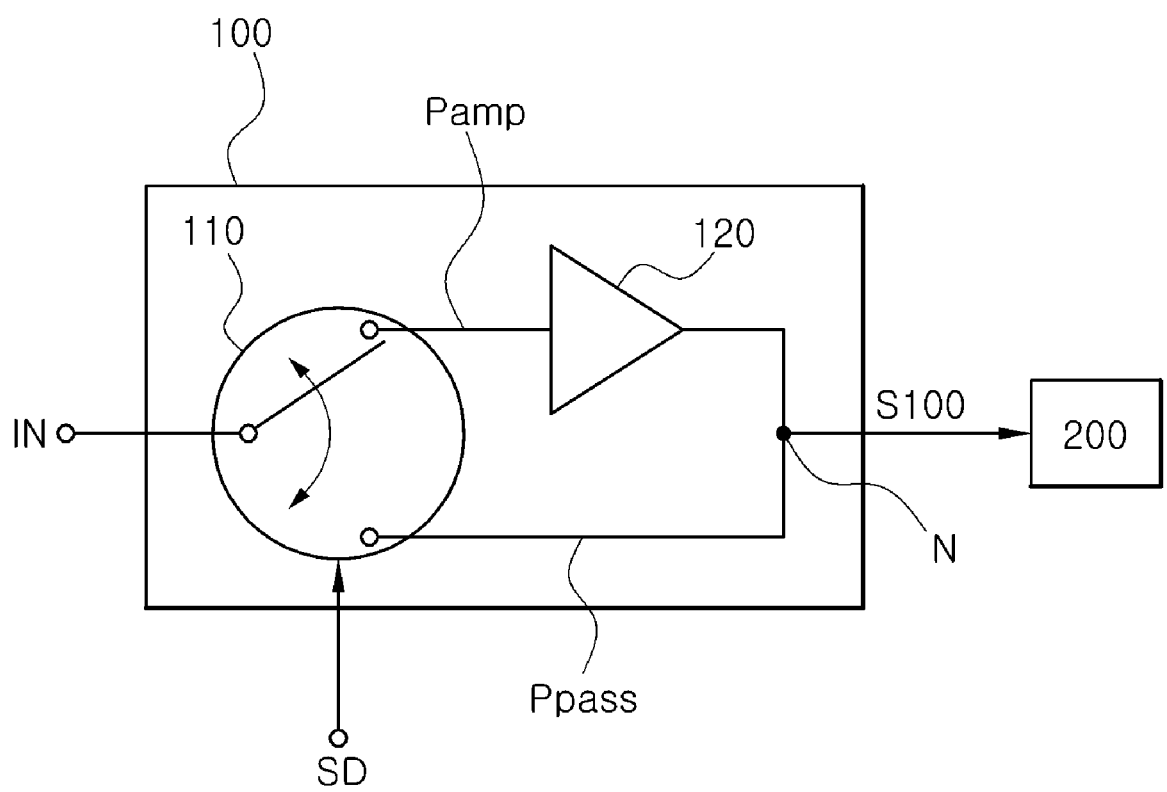
FIG. 5 is a configuration view illustrating a low noise amplifier according to an exemplary embodiment of the present invention.

FIG. 5 is a configuration view illustrating a low noise amplifier according to an exemplary embodiment of the present invention.

Referring to FIG. 5, the low noise amplifier 100 includes a switch 110 and an amplifier 120. The path switch 110 connects a received signal input terminal IN to one of an amplification path Papm and a bypass path Ppass according to the detection signal SD. The amplifier 120 is provided along the amplification path Pamp selected by the path switch 110 and amplifies the signal passing through the path switch 110 and the amplification path Pamp.

Figure 6:
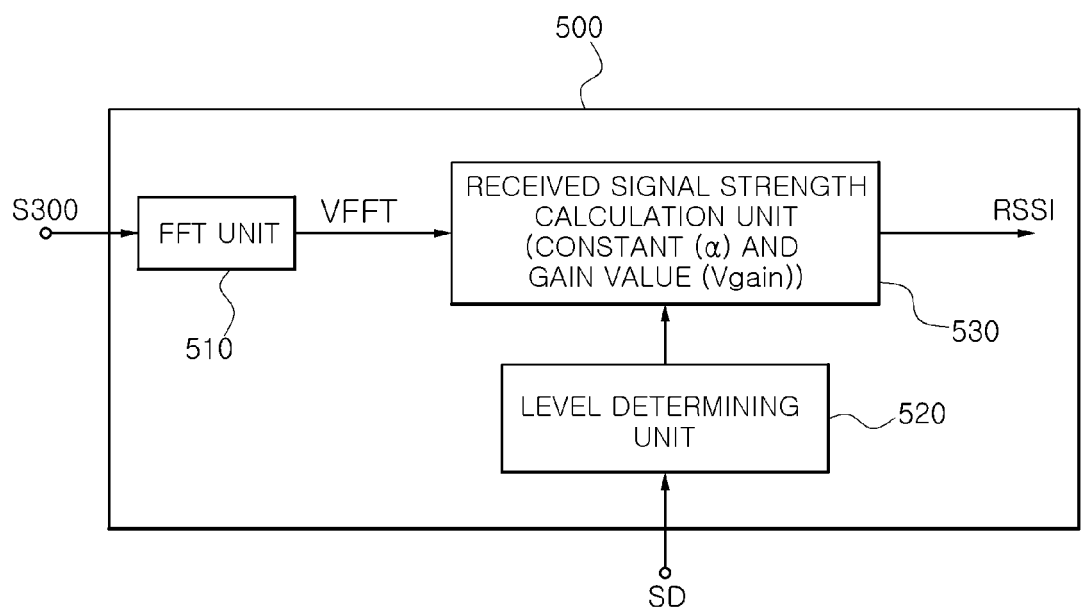
FIG. 6 is a configuration view illustrating a demodulator according to an exemplary embodiment of the present invention.

FIG. 6 is a configuration view illustrating a demodulator according to an exemplary embodiment of the present invention.

Referring to FIG. 6, the demodulator 500 includes an FFT unit 510, a level determining unit 520, and a received signal strength indication (RSSI) calculation unit 530. The FFT unit 510 obtains the FFT result VFFT with respect to the signal from the sigma-delta A/D converter 300. The level determining unit 520 determines a level of the detection signal SD. The RSSI calculation unit 530 subtracts the predetermined gain value Vgain from the FFT result VFFT to obtain received signal strength indication (RSSI) according to the level determined by the level determining unit 520.

More specifically, the RSSI calculation unit 530 adds a predetermined constant α to the FFT result VFFT to obtain received signal strength indication (RSSI) when the level is a weak signal level and adds the predetermined constant α to and subtracts the gain value Vgain from the FFT result VFFT to obtain the RSSI when the level is a strong signal level.

Figure 7:
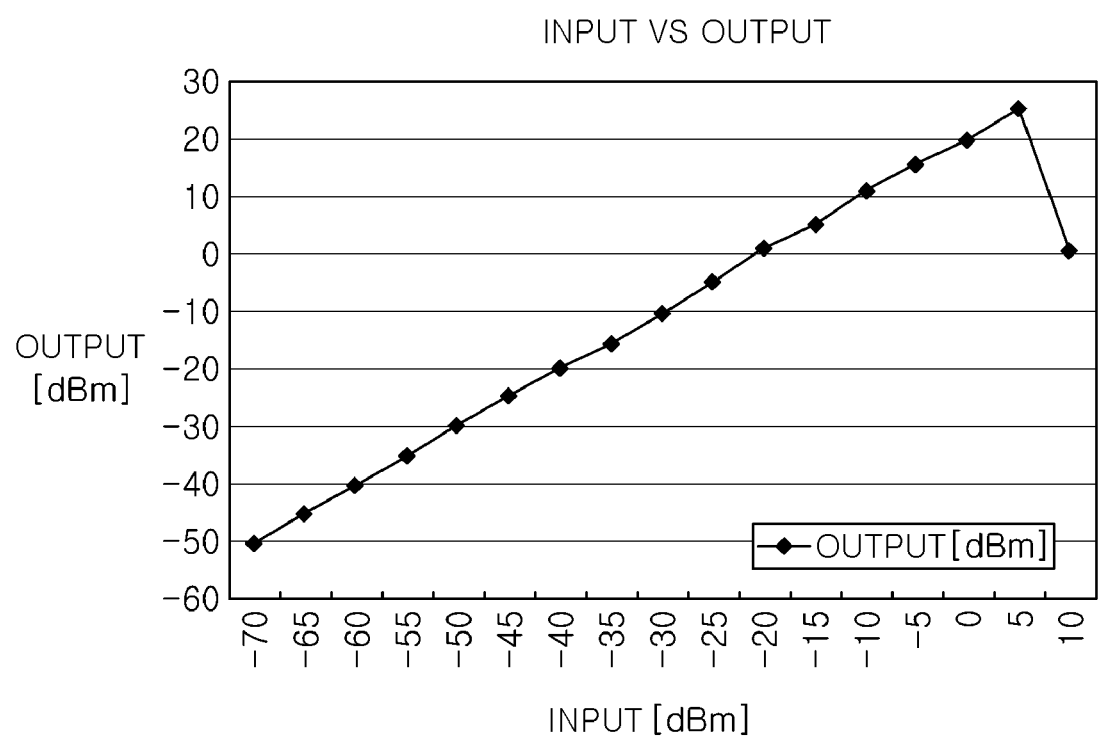
FIG. 7 is an input and output graph of the sigma-delta A/D converter according to the exemplary embodiment of the present invention.

FIG. 7 is an input and output graph of a sigma-delta A/D converter according to an exemplary embodiment of the present invention.

In the graph, shown in FIG. 7, the vertical axis represents output of the sigma-delta A/D converter, and the horizontal axis represents input of the sigma-delta A/D converter. Referring to the graph of FIG. 7, distortion may occur in output when an input signal is at too high a level.

Hereinafter, the operation and effect of the invention will be described in detail with reference to the accompanying drawings.

The receiver with a sigma-delta structure according to the embodiment of the invention will now be described with reference to FIGS. 3 to 7. In FIG. 3, the receiver with a sigma-delta structure according to the embodiment of the invention may include the low noise amplifier 100, the mixer 200, the A/D converter 300, the 1 bit detector 400, and the demodulator 500.

Here, the low noise amplifier 100 amplifies a received signal according to a detection signal SD and outputs the amplified signal to the mixer 200.

The mixer 200 converts an RF signal of the low noise amplifier 100 into an IF signal and outputs the IF signal to the sigma-delta A/D converter 300 and the 1 bit detector 400.

The sigma-delta A/D converter 300 converts the IF signal from the mixer 200 into a digital signal and outputs the digital signal to the demodulator 500.

The 1 bit detector 400 determines whether a voltage of the output signal of the mixer 200 is greater than a predetermined reference voltage and outputs the detection signal SD that includes a result of the determination to the demodulator 500 and the low noise amplifier 100.

The demodulator 500 obtains an FFT result VFFT with respect to the signal from the sigma-delta A/D converter 300 and adds or subtracts a predetermined gain value Vgain to or from the FFT result VFFT according to the detection signal SD to thereby calculate the received signal strength indication (RSSI).

The 1 bit detector 400 will be described with reference to FIG. 4.

Referring to FIG. 4, when the 1 bit detector 400 includes the rectifier 410 and the comparator 420, the rectifier 410 rectifies the output signal of the mixer 200, detects a voltage of the output signal of the mixer 200, and outputs the voltage of the output signal to the comparator 420.

The comparator 420 compares the detection voltage Vd from the rectifier 410 with the reference voltage Vref and outputs the detection signal SD including a result of the determination to the demodulator 500 and the low noise amplifier 100 as described above.

That is, in general, since the receiver generally needs to have a dynamic range of approximately 100 dB, it may be difficult to satisfy the dynamic range by using only the sigma-delta A/D converter SDADC. In order to reduce noise power, the order of the sigma-delta A/D converter SDADC and sampling frequency need to increase.

Therefore, the above-described 1 bit detector 400 is provided at a rear stage of the mixer. When a signal having a higher level than a predetermined signal is input, the above-described 1 bit detector 400 disables the low noise amplifier LNA, and the above-described 1 bit detector 400 enables the low noise amplifier LNA when a signal that has a lower level than the predetermined signal is input. Therefore, it is possible to satisfy the dynamic range of the entire receiver.

Further, as described above, as the 1 bit detector is simply configured, it is possible to ensure a dynamic range of the receiver according to the embodiment of the invention and accurately obtain a value with respect to received signal strength indication (RSSI) without influencing current consumption and area.

For example, when the signal input to the low noise amplifier and the mixer is amplified or attenuated by the low noise amplifier or the mixer, and the signal is provided as output of the mixer, the 1 bit detector disables the low noise amplifier to attenuate the input signal when the input signal has a signal level more than −45 dBm, and the 1 bit detector enables the low noise amplifier to amplify the input signal (with gain of approximately 35 dB) when the input signal has a signal level less than of −45 dBm. Here, a reference level is −45 dBm.

This amplification information is also transmitted to the demodulator. As described above, this is considered when calculating the received signal strength indication (RSSI).

Referring to FIG. 5, the low noise amplifier 100 will be described.

Referring to FIG. 5, when the low noise amplifier 100 includes the path switch 110 and the amplifier 120, the path switch 110 connects the received signal input terminal IN to one of the amplification path Papm and the bypass path Ppass according to the detection signal SD.

Further, the amplifier 120 is provided along the amplification path Pamp selected by the path switch 110 and amplifies the signal passing through the path switch 110 and the amplification path Pamp.

Referring to the graph, shown in FIG. 7, when the input signal of the sigma-delta A/D converter is at too high a level, distortion may occur in output. In the low noise amplifier 100 according to the embodiment of the invention, the gain of the received signal is amplified or bypassed according to received signal strength, distortion of the received signal in a strong electric field can be prevented.

Referring to FIG. 6, the demodulator 500 will be described.

Referring to FIG. 6, when the demodulator 500 includes the FFT unit 510, the level determining unit 520, and the RSSI calculation unit 530, the FFT unit 510 obtains the FFT result VFFT with respect to the signal from the sigma-delta A/D converter 300 and outputs the obtained FFT result VFFT to the RSSI calculation unit 530.

Further, the level determining unit 520 determines the detection signal SD whether it is at a high level H or at a low level L, and outputs a level determination signal to the RSSI calculation unit 530.

The RSSI calculation unit 530 subtracts the predetermined gain value Vgain from the FFT result VFFT according to the level determined by the level determining unit 520 to calculate the received signal strength indication (RSSI).

More specifically, when the level is a weak signal level, as shown in the following Equation 2, the RSSI calculation unit 530 adds a predetermined constant α to the FFT result VFFT to obtain the received signal strength indication (RSSI).

Alternatively, as shown in the following Equation 3, when the level is a strong signal level, the RSSI calculation unit 530 adds the predetermined constant α to and subtracts the gain value Vgain from the FFT result VFFT to obtain the received signal strength indication (RSSI).

$$RSSI = VFFT + \alpha \quad \text{[Equation 2]}$$

$$RSSI = VFFT + \alpha + V\text{gain} \quad \text{[Equation 3]}$$

In the above Equations 2 and 3, the constant α is an offset that corresponds to a difference between input and output of the sigma-delta A/D converter.

For example, when the gain value Vgain is 35, and a reference level used to determine whether the level is a weak signal level or a strong signal level is −45 dBm, if a level of the output signal of the mixer is more than −45 dBm, the received signal strength indication (RSSI) is obtained by adding the FFT result VFFT and the constant α to each other. On the other hand, when the level of the output signal of the mixer is less than −45 dBm, the received signal strength indication (RSSI) is obtained by adding the constant α to and subtracting 35 from the FFT result VFFT.

In this way, the receiver according to the embodiment of the invention can accurately detect received signal strength indication (RSSI) without using the automatic gain controller (AGC) or a limiter amplifier.

As set forth above, according to the exemplary embodiments of the invention, a configuration using a sigma-delta A/D converter can perform signal amplification and RSSI calculation without using an automatic gain controller (AGC).

While the present invention has been shown and described in connection with the exemplary embodiments, it will be apparent to those skilled in the art that modifications and variations can be made without departing from the spirit and scope of the invention as defined by the appended claims.

What is claimed is:

1. A receiver with a sigma-delta structure, the receiver comprising:
   a low noise amplifier for amplifying a received signal according to a detection signal;
   a mixer for converting a radio frequency (RF) signal from the low noise amplifier into an intermediate frequency (IF) signal;
   a sigma-delta A/D converter for converting the IF signal from the mixer into a digital signal;
   a 1 bit detector for determining whether a voltage of the IF signal from the mixer is greater than a predetermined reference voltage, and outputting the detection signal based on the determination; and
   a demodulator for obtaining an FFT result with respect to the digital signal from the sigma-delta A/D converter, and adding or subtracting a predetermined gain value to or from the FFT result to calculate a received signal strength indication (RSSI) based on a level of the detection signal.

2. The receiver of claim 1, wherein the 1 bit detector comprises:
   a rectifier for rectifying the IF signal from the mixer, and detecting the voltage of the IF signal from the mixer; and
   a comparator for comparing the detected voltage from the rectifier with the predetermined reference voltage, and outputting the detection signal based on the comparison.

3. The receiver of claim 2, wherein the low noise amplifier comprises:
   a path switch for connecting a received signal input terminal to one of an amplification path and a bypass path according to the detection signal; and
   an amplifier provided along the amplification path selected by the path switch for amplifying the received signal passing through the path switch and the amplification path.

4. The receiver of claim 2, wherein the demodulator comprises:
   an FFT unit for obtaining the FFT result with respect to the digital signal from the sigma-delta A/D converter;
   a level determining unit for determining the level of the detection signal; and
   a received signal strength calculation unit for calculating the received signal strength indication (RSSI) by subtracting the predetermined gain value from the FFT result according to the level determined by the level determining unit.

5. The receiver of claim 4, wherein the received signal strength indication calculation unit obtains the RSSI by adding a predetermined constant to the FFT result when the level is a weak signal level, and obtains the RSSI by adding the predetermined constant to and subtracting the predetermined gain value from the FFT result when the level is a strong signal level.

6. The receiver of claim 1, wherein the low noise amplifier amplifies the received signal according to the detection signal, without using an automatic gain controller.

7. A receiver with a sigma-delta structure, the receiver comprising:
   a low noise amplifier for amplifying a received signal according to a detection signal;
   a mixer for converting a radio frequency (RF) signal from the low noise amplifier into an intermediate frequency (IF) signal;
   a sigma-delta A/D converter for converting the IF signal from the mixer into a digital signal;
   a 1 bit detector for determining whether a voltage of the IF signal from the mixer is greater than a predetermined reference voltage, and outputting the detection signal based on the determination; and
   a demodulator for obtaining an FFT result with respect to the digital signal from the sigma-delta A/D converter, wherein
   if a level of the detection signal is a weak signal level, the demodulator calculates a received signal strength indication (RSSI) by adding a predetermined constant to the FFT result, and
   if the level is a strong signal level, the demodulator calculates the RSSI by adding the predetermined constant to and subtracting a predetermined gain value from the FFT result.

* * * * *